E. G. JOHANSON.
GLASS MOLDING APPARATUS.
APPLICATION FILED JULY 26, 1917.

1,297,566.

Patented Mar. 18, 1919.
2 SHEETS—SHEET 1.

Emil G. Johanson
INVENTOR.

BY
ATTORNEYS.

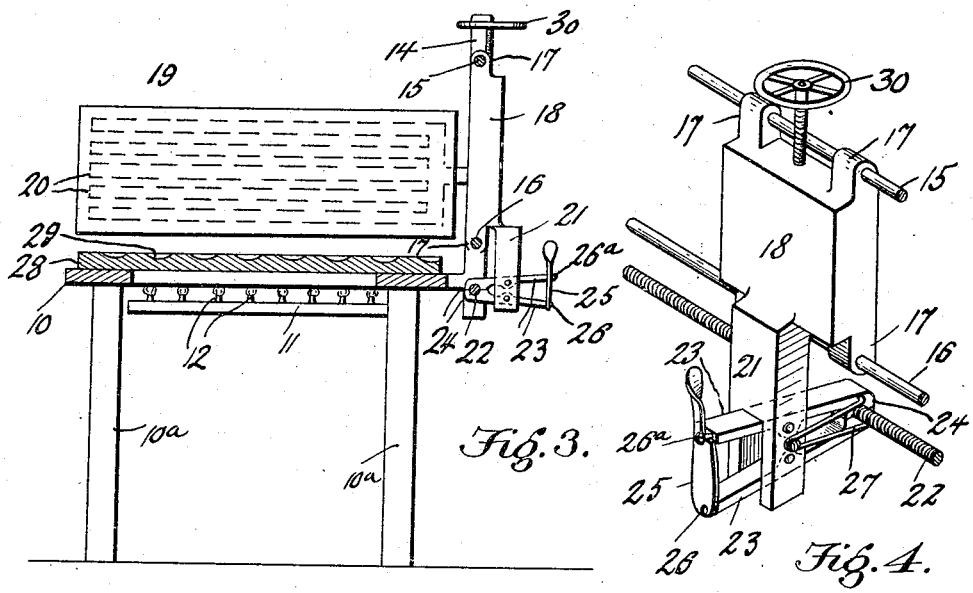
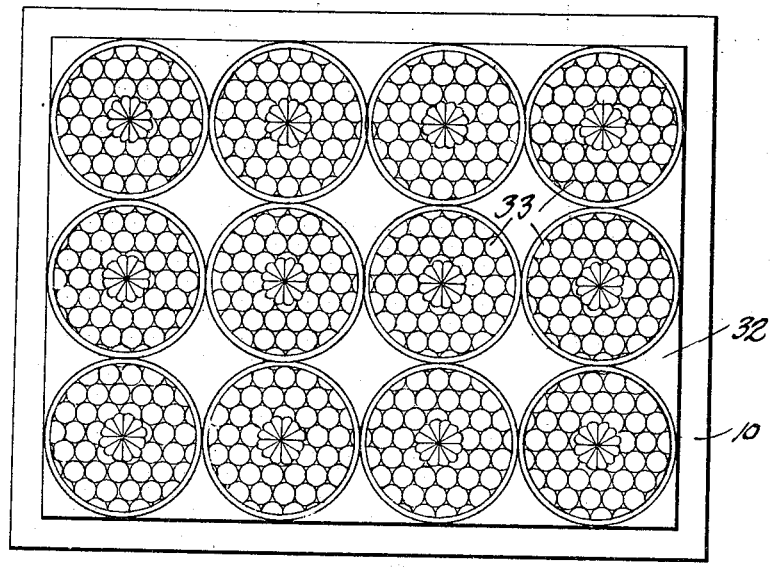

UNITED STATES PATENT OFFICE.

EMIL G. JOHANSON, OF CHICAGO, ILLINOIS.

GLASS-MOLDING APPARATUS.

1,297,566.

Specification of Letters Patent. Patented Mar. 18, 1919.

Application filed July 26, 1917. Serial No. 182,975.

*To all whom it may concern:*

Be it known that I, EMIL G. JOHANSON, a subject of the King of Sweden, residing at Chicago, in the county of Cook and State of Illinois, have invented new and useful Improvements in Glass-Molding Apparatus, of which the following is a specification.

This invention relates to apparatus for molding glass articles, and more particularly an apparatus by which a design is impressed on a flat plate or sheet of glass while the latter is in a sufficiently soft state to receive the impression.

The invention has for its object to provide a simple and efficient apparatus of the kind stated, and to this end it consists in a novel combination and arrangement of parts to be hereinafter described and claimed.

In order that the invention may be better understood, reference is had to the accompanying drawings forming a part of this specification, and in said drawings, Figure 1 is a front elevation of the apparatus;

Fig. 3 is a cross section on the line 3—3 of Fig. 1;

Fig. 4 is a detail in perspective, and

Fig. 5 is a plan view of a mold plate.

Figure 1:
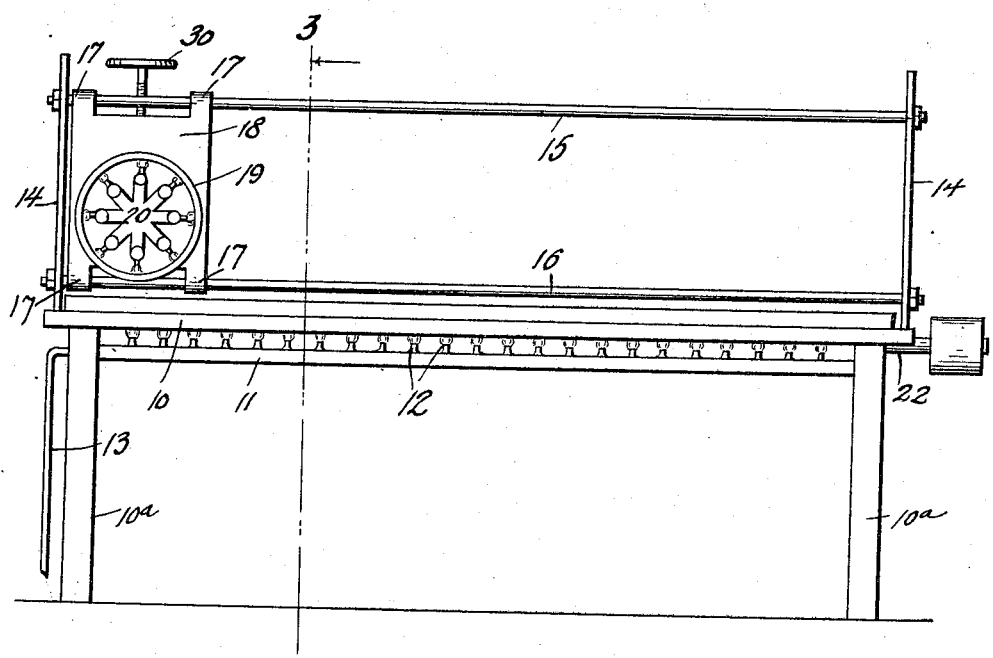
Figure 2:
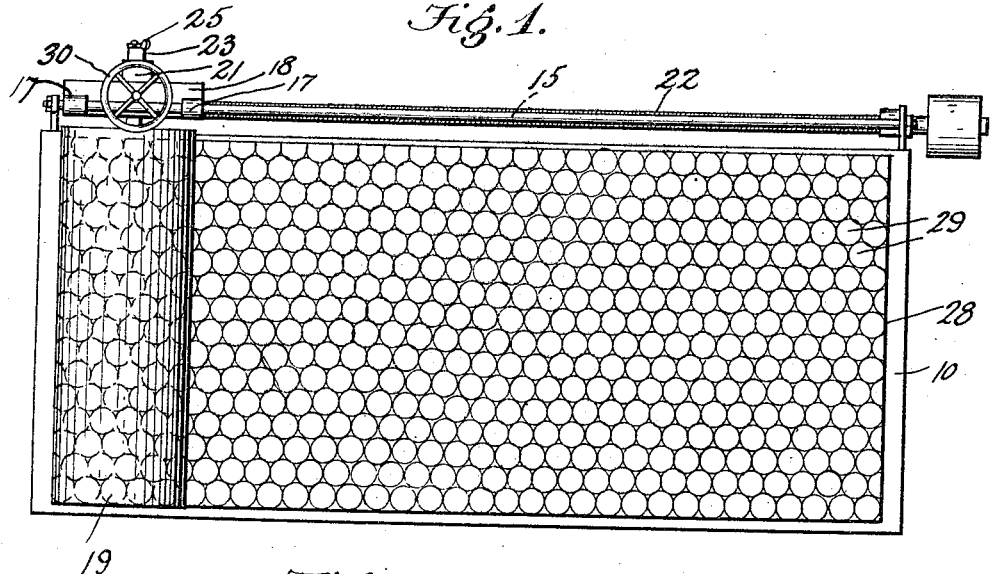
Fig. 2 is a plan view thereof.

Referring specifically to the drawings, 10 denotes the bed of the apparatus, the same being mounted on legs 10$^a$. Beneath the bed is located a gas burner plate 11 having a large number of gas jets 12, and obtaining gas from a supply pipe 13. Any other suitable heater may be provided.

At one side of the bed 10 are two vertical supports 14 for two vertically spaced rods 15 and 16, respectively, located at a suitable height above the bed and extending in the direction of the length thereof. On these rods is slidably mounted by bearings 17, a block 18 supporting a hollow roller 19 extending across the bed 10, said roller being free to turn and containing a spider gas heater 20 to heat the wall thereof. Any other suitable heating element may be employed.

The block 18 has at the bottom a depending extension 21 and between the latter and the rear longitudinal edge of the bed 10 is located a screw shaft 22 extending in the direction of the length of the bed. The part 21 carries a pair of pivoted levers 23 having jaws 24 at one end formed into a nut to engage the screw shaft 22 and travel along the same when said shaft is turned, and thus slide the block 18 on the rods 15 and 16. As shown in Fig. 4, a latch lever 25, pivoted at 26 to one of the levers 23, engages a pin 26$^a$ on the other lever to keep the jaws 24 closed up around the shaft 22. Upon disengaging the latch 25 from the pin 26$^a$, a spring 27 connected to the lever 25 opens the jaws 24 to free the same from the shaft 22.

The bed 10 is open to permit the heating medium 11 beneath the same to heat a mold plate 28 laid on the bed, said plate being of steel and impressed with depressions 29 arranged to produce the desired design.

In operation, a plate of soft glass is laid on the plate 28, and the roller 19 is lowered by a suitable screw device actuated by a hand wheel 30, to press the glass plate. With the screw shaft 22 set in motion, the roller 19 will travel along the glass plate and press down on the latter so that the design on the plate 28 is impressed on the bottom of the glass plate. As the plate 28 and the roller 19 are kept hot the glass will not harden appreciably during the process.

Fig. 5 shows a mold plate 32 having designs 33 to produce a plurality of headlight lenses with one operation, and only one mold plate.

It will be understood, of course, that the design on the mold plate may be varied according to the design which the glass is to have, and while the preferred embodiment of the apparatus has been shown, it will be evident that various changes and modifications may be made without a departure from the spirit and scope of the invention as claimed hereinafter.

I claim:—

1. A glass molding apparatus, comprising a bed, a mold plate supported on said bed and having a design on its upper surface, a feed screw extending in the direction of the length of the bed, longitudinal guides above the bed, a slide mounted on the guides and having a feed nut engageable with the feed screw, and a vertically adjustable presser roller carried by the slide and positioned above the mold plate.

2. A glass molding apparatus, comprising a bed, a mold plate supported on said bed and having a design on its upper surface, a feed screw extending in the direction of the length of the bed, longitudinal guides above the bed, a slide mounted on the guides, a pair of pivoted levers carried by the slide and having jaws shaped to form a feed nut engaging the feed screw, a latch for closing the jaws over the feed screw, and a vertically adjustable presser roller carried by the slide and positioned above the mold plate.

3. A glass molding apparatus, comprising a bed, a mold plate supported on said bed and having a design on its upper surface, a feed screw extending in the direction of the length of the bed, longitudinal guides above the bed, a slide mounted on the guides, a pair of pivoted levers carried by the slide and having jaws shaped to form a feed nut engaging the feed screw, and a vertically adjustable presser roller carried by the slide and positioned above the mold plate.

4. A glass molding apparatus, comprising a bed, a mold plate supported on said bed and having a design on its upper surface, a feed screw extending in the direction of the length of the bed, longitudinal guides above the bed, a slide mounted on the guides and having a feed nut engageable with the feed screw, a vertically adjustable presser roller carried by the slide and positioned above the mold plate, said roller being hollow, and a heater inside the roller.

In testimony whereof I affix my signature.

EMIL G. JOHANSON.

Copies of this patent may be obtained for five cents each, by addressing the "Commissioner of Patents, Washington, D. C."